United States Patent
So et al.

(10) Patent No.: US 9,211,857 B2
(45) Date of Patent: Dec. 15, 2015

(54) BUMPER BEAM ASSEMBLY SYSTEM

(71) Applicant: LOTTE CHEMICAL CORPORATION, Seoul (KR)

(72) Inventors: Choul Won So, Daejeon (KR); Jong Wook Lee, Daejeon (KR); Jun Youp Kim, Daejeon (KR); Kyo Min Lee, Sokho-si (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/555,992

(22) Filed: Nov. 28, 2014

(65) Prior Publication Data
US 2015/0137539 A1    May 21, 2015

Related U.S. Application Data

(62) Division of application No. 13/975,661, filed on Aug. 26, 2013, now abandoned.

(30) Foreign Application Priority Data

Aug. 27, 2012  (KR) .................. 10-2012-0093512
Aug. 27, 2012  (KR) .................. 10-2012-0093513

(51) Int. Cl.
*B60R 19/00* (2006.01)
*B60R 19/03* (2006.01)
*B60R 19/34* (2006.01)
*B60R 19/24* (2006.01)
*B60R 19/18* (2006.01)

(52) U.S. Cl.
CPC ................. *B60R 19/03* (2013.01); *B60R 19/18* (2013.01); *B60R 19/24* (2013.01); *B60R 19/34* (2013.01); *B60R 2019/1833* (2013.01)

(58) Field of Classification Search
CPC ........ B60R 19/03; B60R 19/18; B60R 19/24; B60R 19/34
USPC .................. 296/120, 154, 132, 155, 130, 121
See application file for complete search history.

(56) References Cited

U.S. PATENT DOCUMENTS 6,318,775 B1 *  11/2001  Heatherington et al. ..... 293/120
7,080,862 B2 *   7/2006  Suzuki et al. ................. 293/154

* cited by examiner

*Primary Examiner* — Joseph D Pape
(74) *Attorney, Agent, or Firm* — Paratus Law Group, PLLC (57) ABSTRACT

A bumper beam assembly system includes a bumper beam and a stay connecting the bumper beam to a vehicle, wherein the stay is replaceably coupled to both sides of the bumper beam to occupy a corner portion of the bumper beam. The bucket structure includes a frame assembly part that is coupled to a frame, a first sidewall disposed on one side of the frame assembly part to constitute the corner portion of the bumper beam, a second sidewall disposed on the other side of the frame, and a bumper beam assembly part extending from the frame assembly part, the first sidewall, and the second sidewall in a flange shape and coupled to the bumper beam.

3 Claims, 9 Drawing Sheets

How the overall rating is determined: The front full and rear full test damages are multiplied by two — because in the real world full-width impacts occur approximately twice as often as corner impacts — and that total is added to the front corner and rear corner test damages. The sum is then divided by six to get the weighted average. This number determines the overall rating. The good/acceptable boundary is $500, the acceptable/marginal boundary is $1,000 and the marginal/poor boundary is $1,500. However, no vehicle can earn a rating of good or acceptable if it is deemed undrivable or unsafe after a test because of headlamp or taillamp damage, hood buckling, coolant loss, or the like. For further information, see our bumper test protocols.

Video: The Institute's 4 bumper test modes

■ Good    A Acceptable    ■ Marginal    ■ Poor  |  Vehicles are listed in order of performance

| | Front full test damage | Front corner test damage | Rear full test damage | Rear corner test damage | Overall weighted average damage | Overall rating |
|---|---|---|---|---|---|---|
| Audi A4 2006 - 2008 | $976 | $2,038 | $918 | $1,899 | $1,288 | M |
| Saab 9-3 2006 - 2009 | $1,476 | $1,076 | $1,722 | $869 | $1,407 | M |
| Lincoln MKZ 2006 - 2009 | $1,001 | $1,966 | $2,330 | $670 | $1,550 | ■ |

BUMPER BEAM ASSEMBLY SYSTEM

CROSS REFERENCE TO PRIOR APPLICATIONS

This application is a Divisional Application of U.S. patent application Ser. No. 13/975,661 filed on Aug. 26, 2013 under 35 U.S.C. §121, which claims priority under 35 U.S.C. §119 to Korean Patent Application Nos. 10-2012-0093512 (filed on Aug. 27, 2012) and 10-2012-0093513 (filed on Aug. 27, 2012), which are all hereby incorporated by reference in their entirety.

BACKGROUND

The present invention relates to a bumper beam assembly system for a vehicle, and more particularly, to a bumper beam assembly system which is capable of minimizing repair costs of a corner part when the corner portion is crashed at a low speed.

A bumper beam assembly represents a functional part protecting a frame when a vehicle is crashed at a low speed and is usually provided with a bumper beam and a stay. In this case, the bumper beam may absorb most of crash energy, and the stay may absorb the rest of the crash energy. That is, the bumper beam that is directly crashed may firstly absorb the crash energy, and the stay through which the bumper beam is connected to the frame to support the bumper beam may secondly absorb the crash energy.

Required performance of the bumper beam assembly constituted as described above may be tested through two tests such as a low speed crash regulation test and a repair cost evaluation crash test which is performed by General Insurance Association (Insurance Institute for Highway Safety (IIHS) and Research Council for Automobile Repairs (RCAR)). In particular, since the low speed crash test performed by General Insurance Association may evaluate the repair costs after a low speed crash to utilize a standard for appropriating a premium, and thus the low speed crash test has a large effect on vehicle sales. Thus, most automobile manufacturers are putting a great deal of effort to develop a bumper beam assembly having cheap repair costs in consideration of the repair cost evaluation (commercial value evaluation) performed by General Insurance Association.

Figure 1:
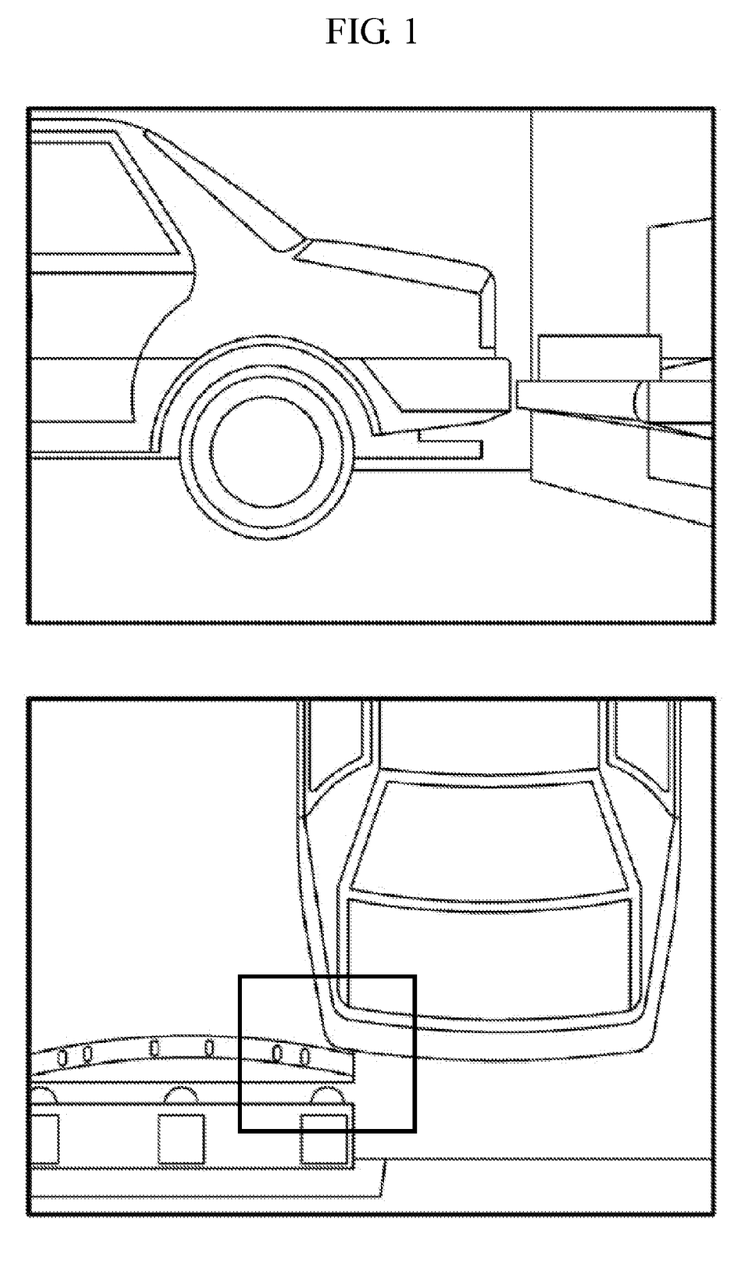
FIG. 1 is a view illustrating a process of an IIHS low speed crash test.
Figure 2:
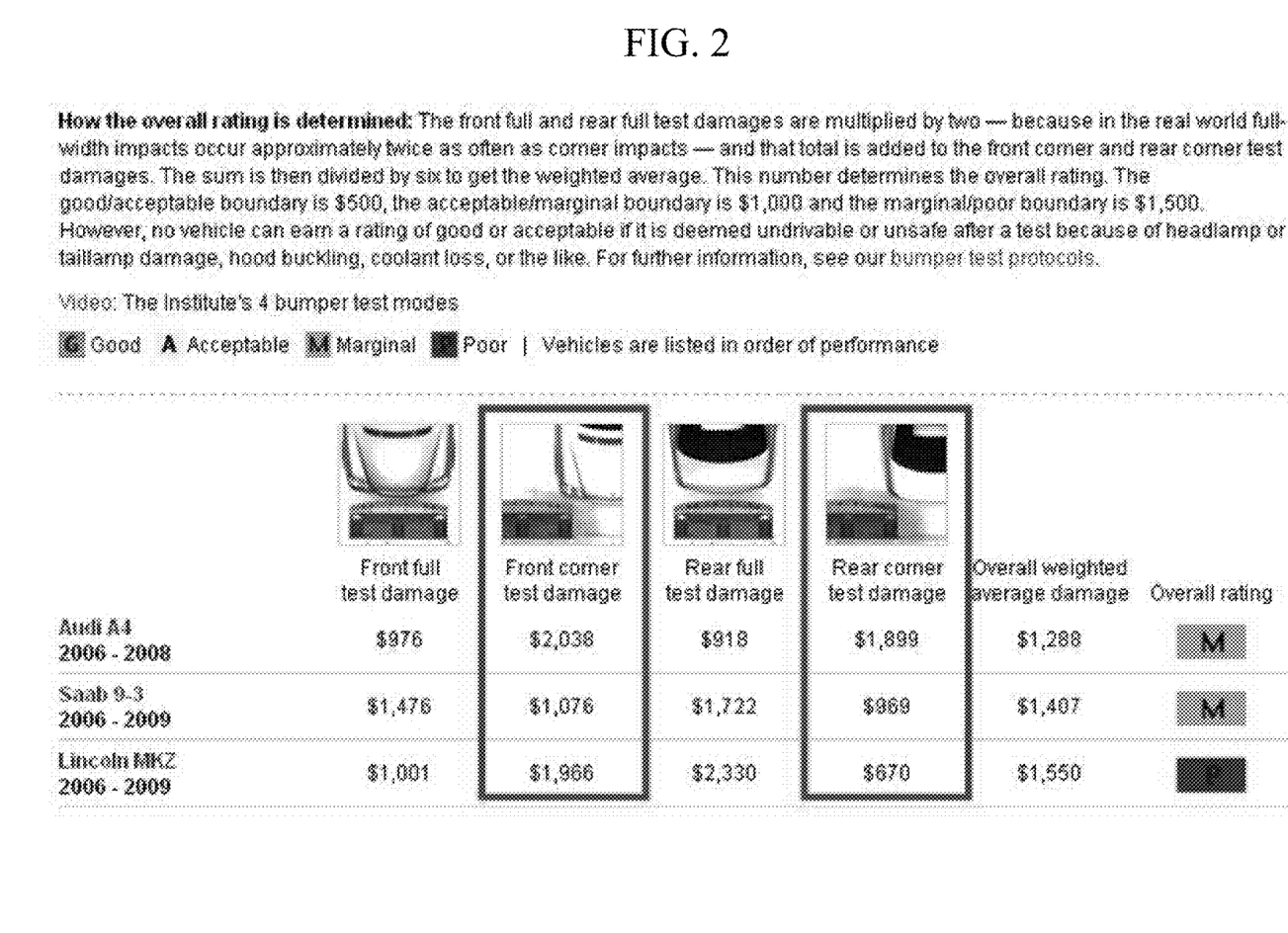
FIG. 2 is a view exemplifying a result of an IIHS low speed crash test.

In this regard, IIHS may offset a central portion of a vehicle bumper and about 15% of an overall width of the vehicle by using a bumper dummy to perform a low speed crash test at about 10 KPH and about 5 KPH, as shown in FIG. 1, thereby appropriating the repair costs and announcing to mass communication. For reference, a result of the low speed crash test performed by IIHS is exemplified in FIG. 2. Generally, a bumper beam having excellent performance may have repair costs required when the bumper beam assembly and the bumper cover assembly are replaced without being damaged in itself after the test is performed by IIHS.

In recent years, a bumper beam formed of a low-weight, high-performance plastic composite material is widely applied so as to improve fuel efficiency. Since the plastic composite material is lighter than steel, the plastic composite material may be effective in aspects of vehicle fuel efficiency. However, since the plastic composite material is relatively expensive when compared to that of the steel, the repair cost evaluation performed by General Insurance Association may cause poor results due to the high replacement costs. Also, the bumper beam formed of the plastic composite material may have high strength through compression-molding. However, the bumper beam may be weak in strength at both ends thereof due to the compression-molding. As a result, the damaged beam and deformed stay should be replaced in the 15% offset test performed by IIHS (hereinafter, referred to as an "IIHS 15% offset test").

Figure 3:
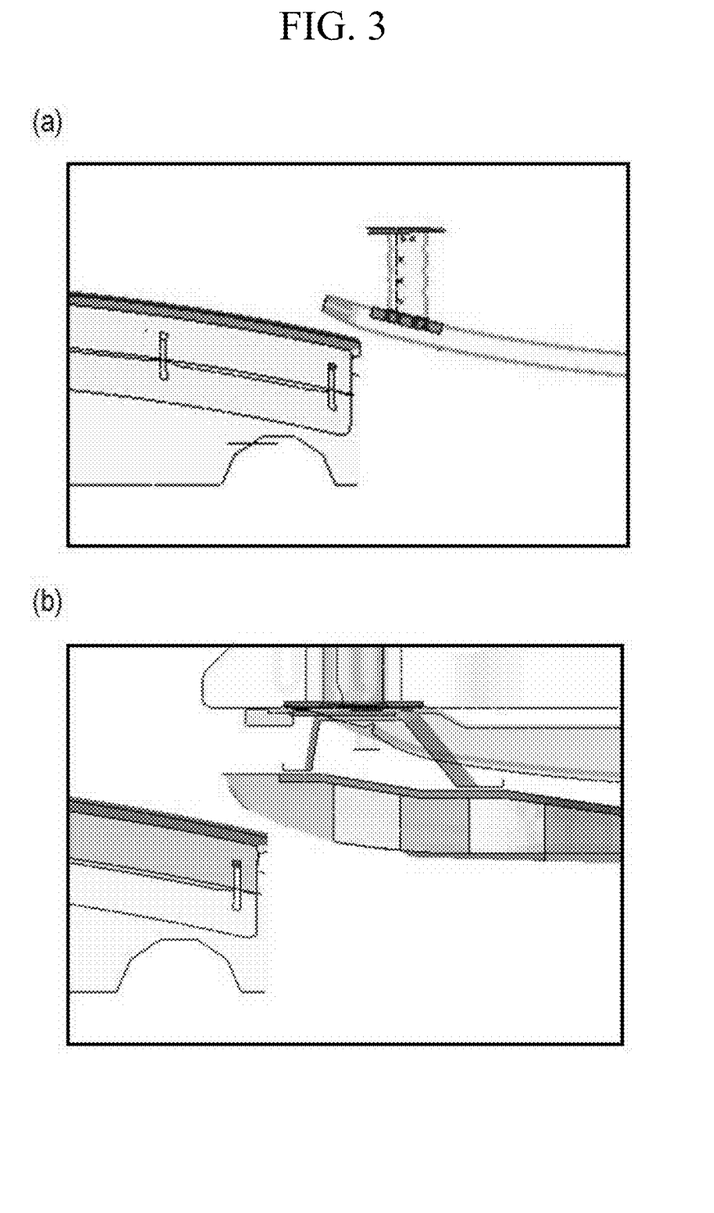
FIG. 3 is a view of a steel bumper beam assembly and a plastic composite material bumper beam assembly according to a related art.

In detail, bumper assemblies having various shapes are disclosed in Korean Patent Application Nos. 10-2008-0069637, 10-2009-0081580, 10-2007-0002937, 10-2009-0093518, 10-2008-0059204 and 10-2011-0122098. However, in the related arts above described, as shown in FIG. 3, simple and usual steel beams or plastic composite material beams are provided. Also, since an extruded crash box for a vehicle is disposed behind the bumper beam, the bumper beam may be firstly crashed and damaged, and then the stay or crash box may be deformed or damaged in the IIHS 15% offset test. Therefore, costs for replacing the whole bumper beam assembly may be required.

SUMMARY

The present invention provides a bumper beam assembly system in which repair costs for replacing components damaged when the vehicle is crashed at a low speed are reduced to satisfy an IIHS 15% offset test.

The present invention also provides the bumper beam assembly which overcomes a limitation in a shape of a stay and improves vehicle fuel efficiency through weight lighting thereof.

According to an aspect of the present invention, a bumper beam assembly system includes: a bumper beam; and a stay connecting the bumper beam to a vehicle, wherein the stay is replaceably coupled to both sides of the bumper beam to occupy a corner portion of the bumper beam.

The stay may include a bucket structure or a partition wall structure.

The bucket structure may include: a frame assembly part that is coupled to a frame; a first sidewall disposed on one side of the frame assembly part to constitute the corner portion of the bumper beam; a second sidewall disposed on the other side of the frame; and a bumper beam assembly part extending from the frame assembly part, the first sidewall, and the second sidewall in a flange shape and coupled to the bumper beam.

The partition wall structure may include: a first outer wall couples to a rare end of the bumper beam; a second outer wall disposed on one side of the first outer wall to constitute the corner portion of the bumper beam; a third outer wall disposed on the other side of the first outer wall; a fourth outer wall connecting the second outer wall to the third outer wall, the fourth outer wall being couple to the frame; and at least one partition wall vertically connecting the first outer wall to the fourth outer wall.

The stay may be formed of steel or a thermoplastic or thermosetting composite material.

The composite material may include a synthetic resin and a glass fiber and is press-molded.

According to the present invention, the stay may be separably mounted on both side ends of the bumper beam so that only the damaged stay is replaced when the corner portion of the bumper beam is crashed to significantly reduce the repair costs.

Also, since the all of the steel and the plastic composite material are used as the stay, the stay is very superior in applicability. Particularly, if it is difficult to mold the stay by using the steel material, the plastic composite material may be used to freely realize the desired shapes as well as to improve the vehicle fuel efficiency through the weight lighting of the stay.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown. The present invention may, however, be embodied in different forms and should not be construed as limited to the embodiments set forth herein. In the drawings, anything unnecessary for describing the present disclosure will be omitted for clarity, and like reference numerals refer to like elements throughout.

Figure 4:
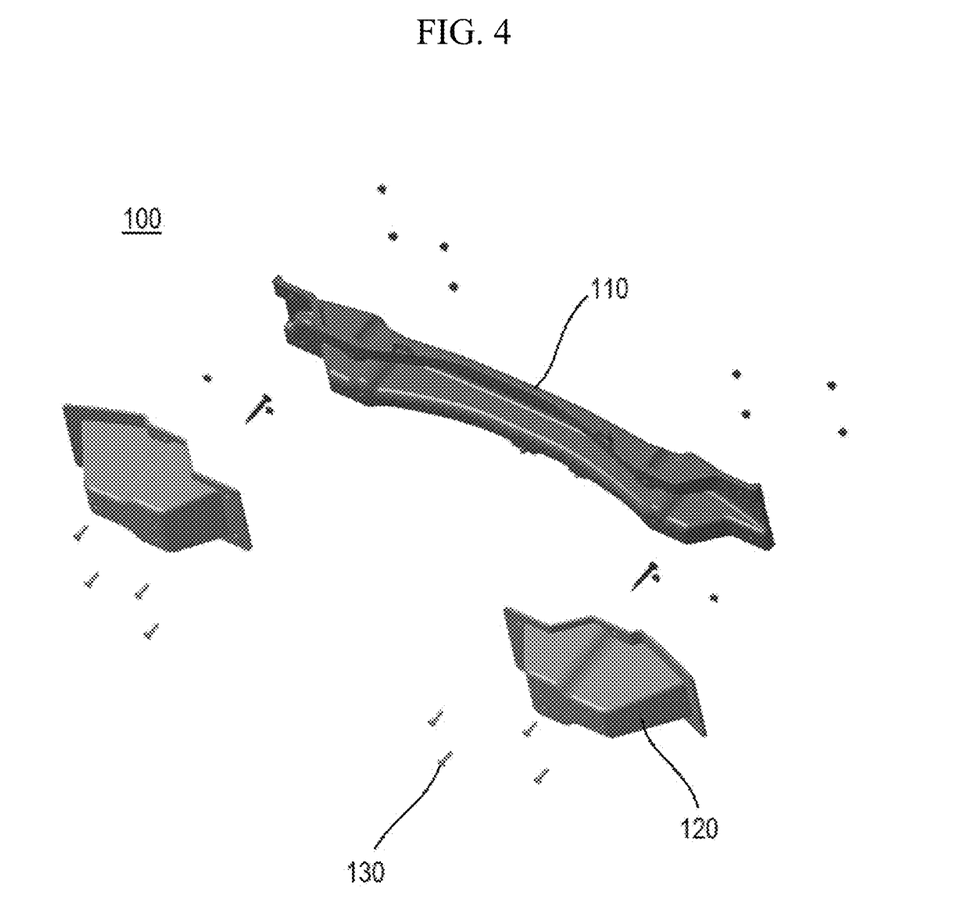
FIG. 4 is an exploded perspective view of a bumper beam assembly system according to an embodiment of the present invention.
Figure 5:
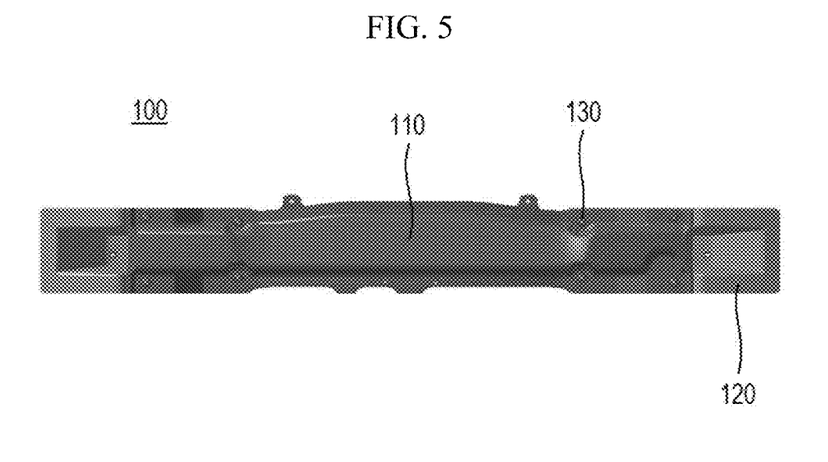
FIG. 5 is a front view of the bumper beam assembly system according to an embodiment of the present invention.
Figure 6:
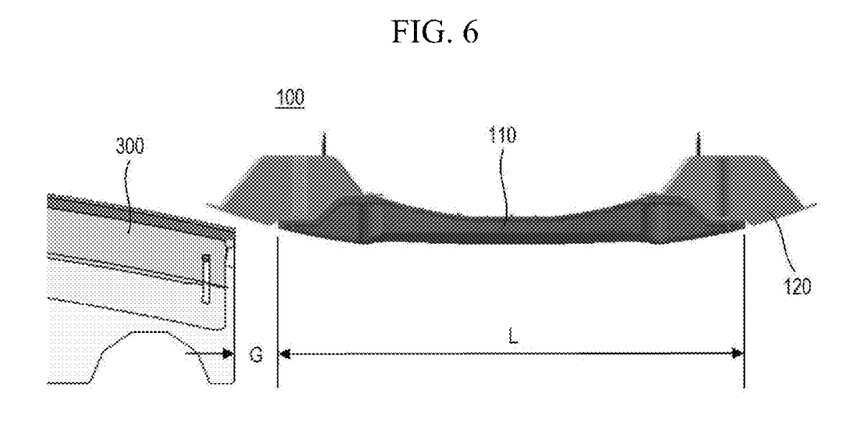
FIG. 6 is a plan view of the bumper beam assembly system according to an embodiment of the present invention.

FIG. 4 is an exploded perspective view of a bumper beam assembly system according to an embodiment of the present invention, FIG. 5 is a front view of the bumper beam assembly system according to an embodiment of the present invention, and FIG. 6 is a plan view of the bumper beam assembly system according to an embodiment of the present invention.

As shown in FIGS. 4 to 6, a bumper beam assembly system 100 according to an embodiment of the present invention may include a bumper beam 110 and a stay 120. Here, the current embodiment is characterized in that the bumper beam 110 is shortened in length, and then the stay 120 is applied on the shortened portion of the bumper beam 110. Hereinafter, each of parts will be described in detail.

The bumper beam 110 is configured to absorb an impact generated when a vehicle is frontally crashed. The bumper beam 110 is connected to a frame by the stay 120. The bumper beam may be compression-molded by using a plastic composite material. The bumper beam 110 may have a length (L) shorter than that of the bumper beam according to the related art as described above. In detail, as shown in FIG. 6, the length (L) of the bumper beam may be determined in consideration of a crash position and gap (G) so that the bumper beam 110 may do not overlap a barrier 300 in an IIHS corner bumper dummy test.

The stay 120 is configured to absorb an impact generated when a corner portion of the vehicle is crashed. The stay 120 is coupled to the bumper beam 110 by using a coupling unit 130. The present invention is characterized in that the stay 120 occupies both ends of the bumper beam 110. That is, the stay 120 may be disposed on the portion of the bumper beam 110 of which the length is reduced. Thus, only the stay 120 damaged when the corner portion is crashed at a low speed may be replaced to significantly reduce repair costs. Hereinafter, a structure of the stay 120 will be described below in more detail with reference to the accompanying drawings.

Figure 7:
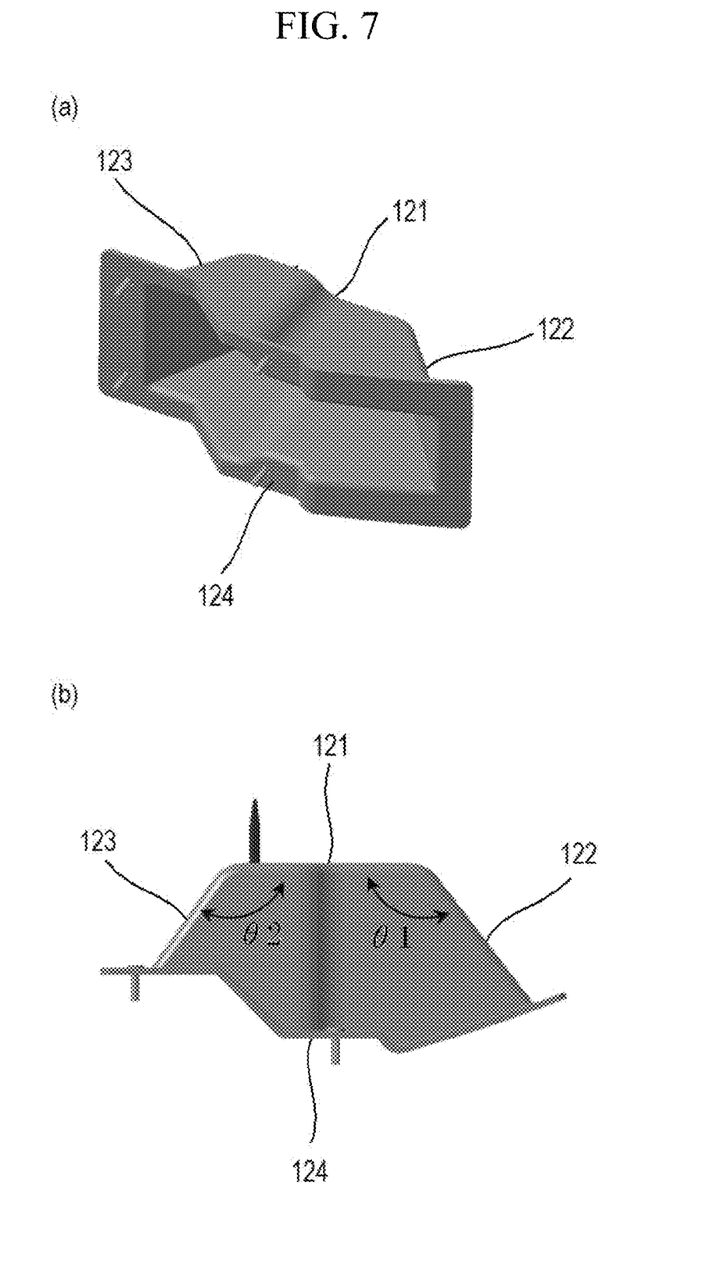
FIG. 7 is a view illustrating a stay of the bumper beam assembly system according to an embodiment of the present invention.

FIG. 7 is a view illustrating the stay of the bumper beam assembly system according to an embodiment of the present invention.

Referring to FIG. 7, the stay 120 includes a frame assembly part 121 having an Approximately 'ㄷ' shape in sectional structure and coupled to the frame, a first sidewall 122 disposed on one side of the frame assembly part 121 to constitute a corner portion of the bumper beam 110, a second sidewall 123 disposed on the other side of the frame assembly part 121, and a bumper beam assembly part 124 extending from each of the frame assembly part 121, the first sidewall 122, and the second sidewall 123 in a flange shape and coupled to the bumper beam 110.

That is, the stay 120 according to the present invention may be provided in a bucket shape of which one side is opened to define an empty space therein. Thus, the bumper beam 110 may be inserted to the empty space to butt-couple the bumper beam 110 to the frame in a state where the stay 120 is coupled to the bumper beam 110.

In this case, the first sidewall 122 may have a predetermined angle θ1 with respect to the frame assembly part 121 in consideration of an overlapping amount (about 15% of an overall width of the vehicle) in the IIHS corner bumper dummy test. Also, the second sidewall 123 may have a predetermined angle θ2 with respect to the frame assembly part 121 in consideration of the IIHS corner bumper dummy test.

The stay 120 may be molded through press-drawing by using a steel material or may be press-compression molded by using a plastic composite material. However, since each of most vehicles being released at the present have a great package space, it may be difficult to mold the stay 120 by using a steel material for which deep-drawing is required. Thus, in this case, an easily moldable plastic composite material may be used. As a result, a limitation in shape realization may be overcome, and also, fuel efficiency may be improved through weight lighting of the stay 120. In this case, a thermoplastic composite material and a thermosetting composite material, which contain a synthetic resin and a glass fiber, may be used as the plastic composite material.

The bumper beam assembly system according to an embodiment of the present invention was described above. Hereinafter, a bumper beam assembly system according to another embodiment of the present invention will be described with reference to the accompanying drawings.

Figure 8:
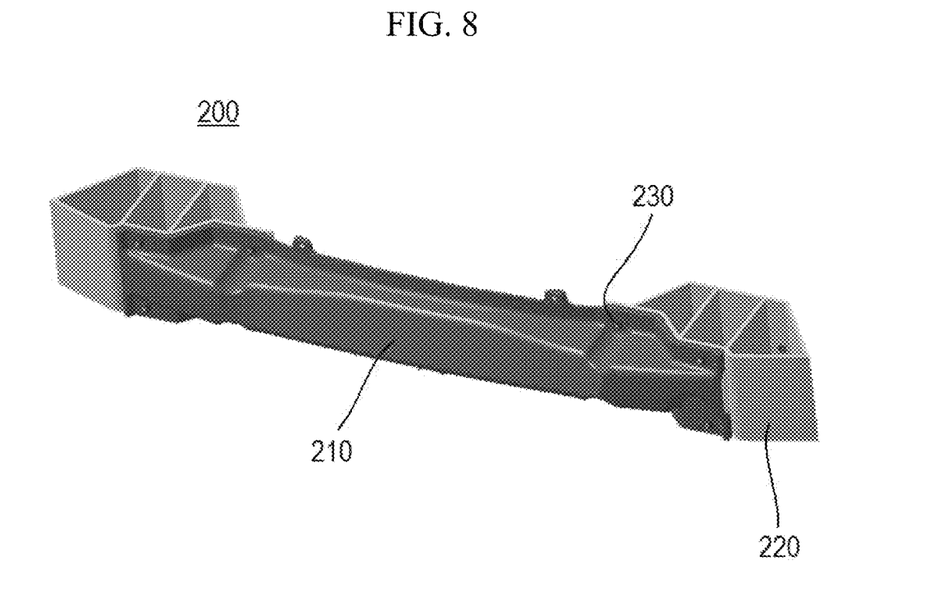
FIG. 8 is a plan view of a bumper beam assembly system according to another embodiment of the present invention.
Figure 9:
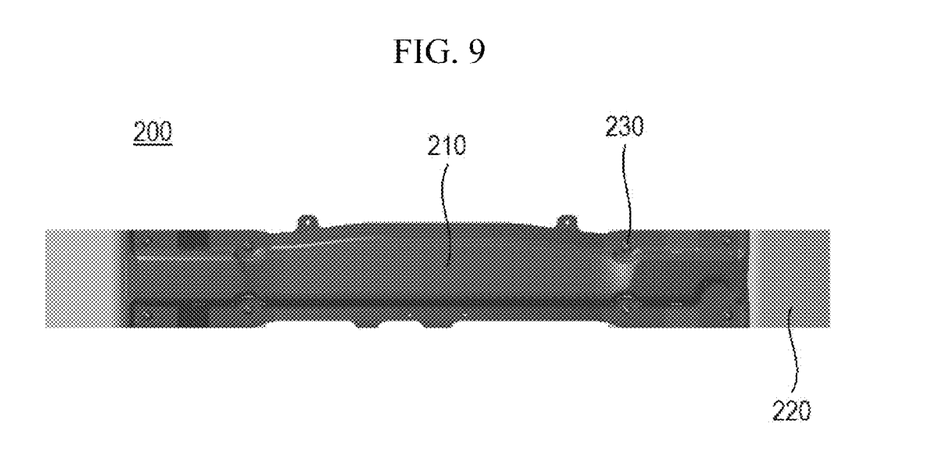
FIG. 9 is a front view of the bumper beam assembly system according to another embodiment of the present invention.
Figure 10:
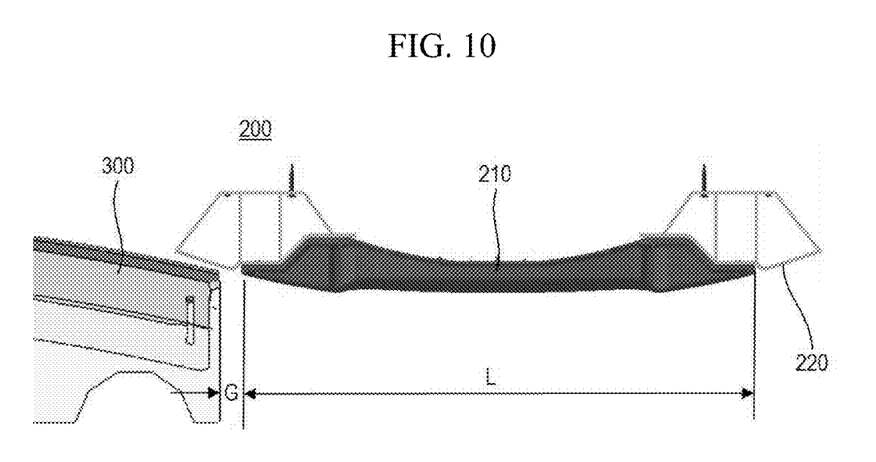
FIG. 10 is a plan view of the bumper beam assembly system according to another embodiment of the present invention.

FIG. 8 is a plan view of a bumper beam assembly system according to another embodiment of the present invention, FIG. 9 is a front view of the bumper beam assembly system according to another embodiment of the present invention, and FIG. 10 is a plan view of the bumper beam assembly system according to another embodiment of the present invention.

As shown in FIGS. 8 to 10, a bumper beam assembly system 200 according to another embodiment of the present invention may include a bumper beam 210 and a stay 220, like the foregoing embodiment. However, the stay 220 may have a structure different from that of the foregoing embodiment. Hereinafter, stay 220 will be described below in detail with reference to the accompanying drawings.

Figure 11:
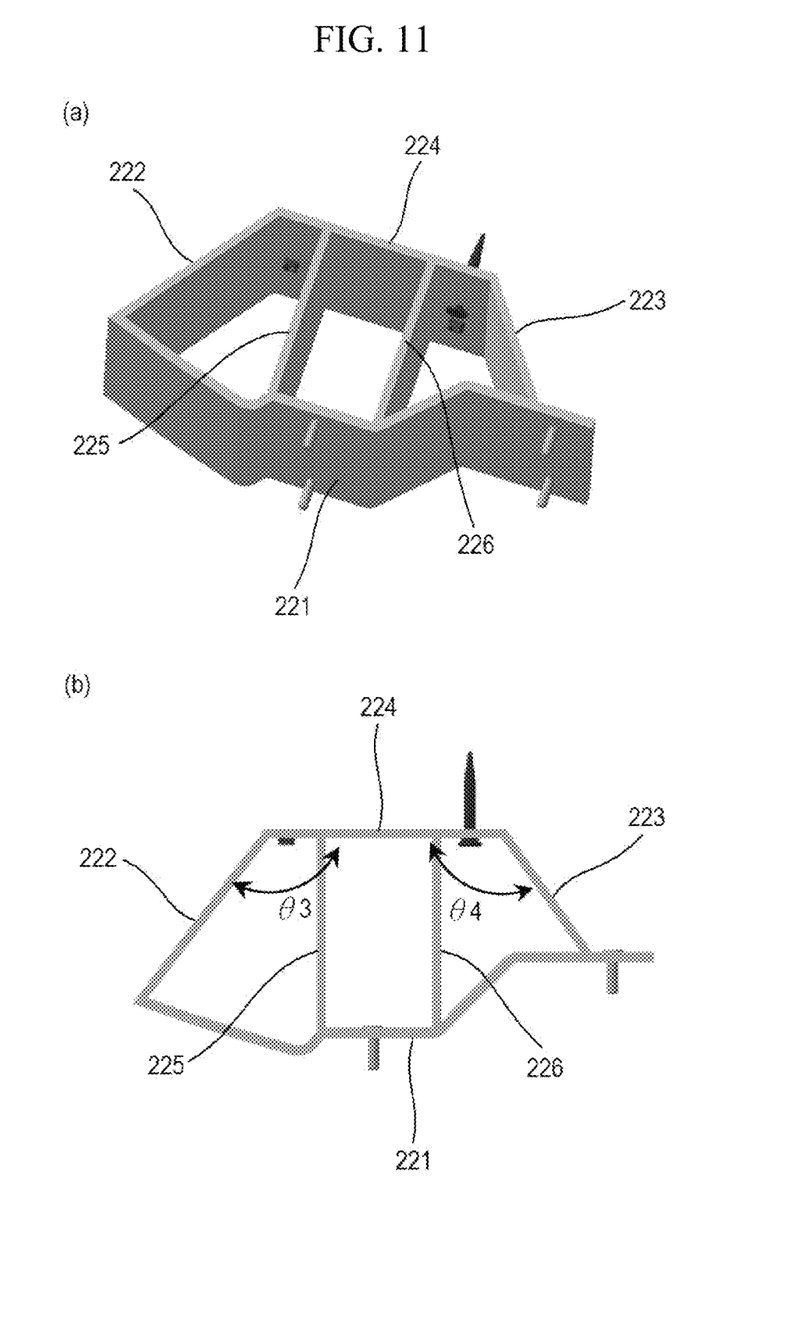
FIG. 11 is a view illustrating a stay of the bumper beam assembly system according to another embodiment of the present invention.

FIG. 11 is a view illustrating the stay of the bumper beam assembly system according to another embodiment of the present invention.

Referring to FIG. 11, the stay 220 may include a partition wall structure including a plurality of outer walls 221, 222, 223, and 224 and partition walls 225 and 226.

In detail, the outer walls 221, 222, 223, and 224 may include a first outer wall 221 coupled to a rear end of the bumper beam 210, a second outer wall 222 disposed on one side of the first outer wall 221 to constitute a corner portion of the bumper beam 210, a third outer wall 223 disposed on the other side of the first outer wall 221, and a fourth outer wall 224 connecting the second outer wall 222 to the third outer wall 223 and couple to the frame. As a result, the outer walls 221, 222, 223, and 224 may define a space therein. The partition walls 225 and 226 may be vertically disposed at a uniform distance between the first outer wall 221 and the fourth outer wall 224 to provide a supporting force.

In this case, the second outer wall 222 may be bent at a predetermined angle θ3 with respect to the fourth outer wall 224 in consideration of an overlapping amount (about 15% of an overall width of the vehicle) in an IIHS corner bumper dummy test. Also, the third outer wall 223 may be bent at a predetermined angle θ4 with respect to the fourth outer wall 224 in consideration of the IIHS corner bumper dummy test.

Unlike the stay formed by using steel or aluminum according to the related art, the stay 220 may be injection or extrusion-molded by using a thermoplastic or a thermosetting plastic to improve vehicle fuel-efficiency through weight lighting thereof.

The exemplary embodiments of the present invention were described in detail with reference to the accompanying drawings. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The exemplary embodiments of the present invention were described in detail with reference to the accompanying drawings. The description of the present invention is intended to be illustrative, and those with ordinary skill in the technical field of the present invention pertains will be understood that the present invention can be carried out in other specific forms without changing the technical idea or essential features.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A bumper beam assembly system comprising:
    a bumper beam; and
    a stay connecting the bumper beam to a vehicle,
    wherein the stay is replaceably coupled to one of left and right ends of the bumper beam to occupy a corner portion of the bumper beam,
    wherein the stay has a bucket structure which comprises:
        a closed end coupled to a frame of the vehicle;
        a single open end positioned opposite to the closed end and open toward a direction substantially perpendicular to a longitudinal direction of the bumper beam; and
        a flange bent from the bucket structure at the single open end toward an outside of the bucket structure and coupled to the bumper beam,
    wherein the one of left and right ends of the bumper beam is seated on the flange while covering an inner half of the single open end adjacent to a center portion of the bumper beam such that an outer half of the single open end remains open.

2. The bumper beam assembly system of claim 1, wherein the stay is formed of steel or a thermoplastic or thermosetting composite material.

3. The bumper beam assembly system of claim 2, wherein the composite material comprises a synthetic resin and a glass fiber and is press-molded.

\* \* \* \* \*